United States Patent
Penza et al.

(10) Patent No.: US 10,302,239 B2
(45) Date of Patent: May 28, 2019

(54) LAUNCH SYSTEM FOR A PRESSURIZED PIPELINE

(71) Applicant: ULC ROBOTICS, INC., Hauppauge, NY (US)

(72) Inventors: G. Gregory Penza, Old Field, NY (US); Robert E. Kodadek, Long Beach, NY (US); Michael Passaretti, Smithtown, NY (US); Eric S. Feldman, Glen Head, NY (US); David Antanavige, Douglaston, NY (US); Benjamin Lagosz-Sinclair, Baldwin, NY (US)

(73) Assignee: ULC Robotics, Inc., Hauppauge, NY (US)

( * ) Notice: Subject to any disclaimer, the term of this patent is extended or adjusted under 35 U.S.C. 154(b) by 29 days.

(21) Appl. No.: 15/187,095

(22) Filed: Jun. 20, 2016

(65) Prior Publication Data
US 2016/0369931 A1    Dec. 22, 2016

Related U.S. Application Data

(60) Provisional application No. 62/182,222, filed on Jun. 19, 2015.

(51) Int. Cl.
*F16L 55/46* (2006.01)
*F16J 15/16* (2006.01)

(52) U.S. Cl.
CPC ............ *F16L 55/46* (2013.01); *F16J 15/168* (2013.01)

(58) Field of Classification Search
CPC ................................ F16L 55/46; F16J 15/168
See application file for complete search history.

(56) References Cited

U.S. PATENT DOCUMENTS

| 6,286,542 | B1 | 9/2001 | Morain et al. |
| 6,394,701 | B1 * | 5/2002 | Delaforce ............... F16L 55/18 138/97 |
| 6,682,052 | B2 | 1/2004 | Griffioen et al. |
| 6,691,734 | B2 | 2/2004 | Beals et al. |
| 6,848,541 | B2 | 2/2005 | Griffioen et al. |

(Continued)

OTHER PUBLICATIONS

European Search Report dated Nov. 18, 2016 for related EP Application No. 16175268.8.

*Primary Examiner* — David P Bryant
*Assistant Examiner* — Nirvana Deonauth
(74) *Attorney, Agent, or Firm* — Brooks Kushman P.C.

(57) ABSTRACT

A launch system for a pressurized pipeline includes a housing attachable to the pipeline such that an inside of the housing is open to an interior of the pipeline and an outside of the housing is exposed to an ambient environment outside the pipeline. A first actuator arrangement is disposed on the outside of the housing, and a second actuator arrangement is disposed on the inside of the housing. A seal arrangement is disposed in the housing between the first actuator arrangement and the second actuator arrangement. Each of the first and second actuator arrangements is configured to receive a cable having a portion extending outside the housing, a portion extending through the seal arrangement, and a portion extending inside the housing. The actuator arrangements are independently operable to pull the cable relative to the seal arrangement for moving the cable into and out of the pipeline.

18 Claims, 13 Drawing Sheets

(56) References Cited

U.S. PATENT DOCUMENTS

| | | |
|---|---|---|
| 7,551,197 B2 | 6/2009 | Penza et al. |
| 2004/0006448 A1 | 1/2004 | Penza |
| 2007/0051192 A1 | 3/2007 | Penza et al. |
| 2010/0236639 A1 | 9/2010 | Penza et al. |

* cited by examiner

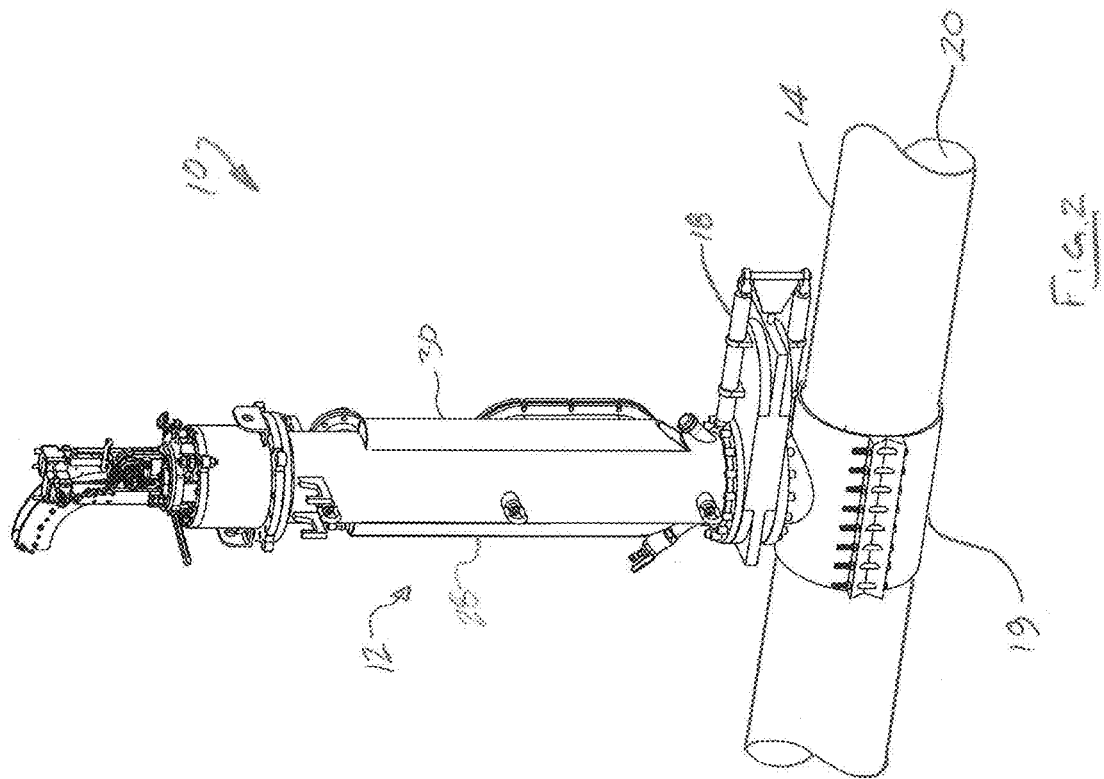
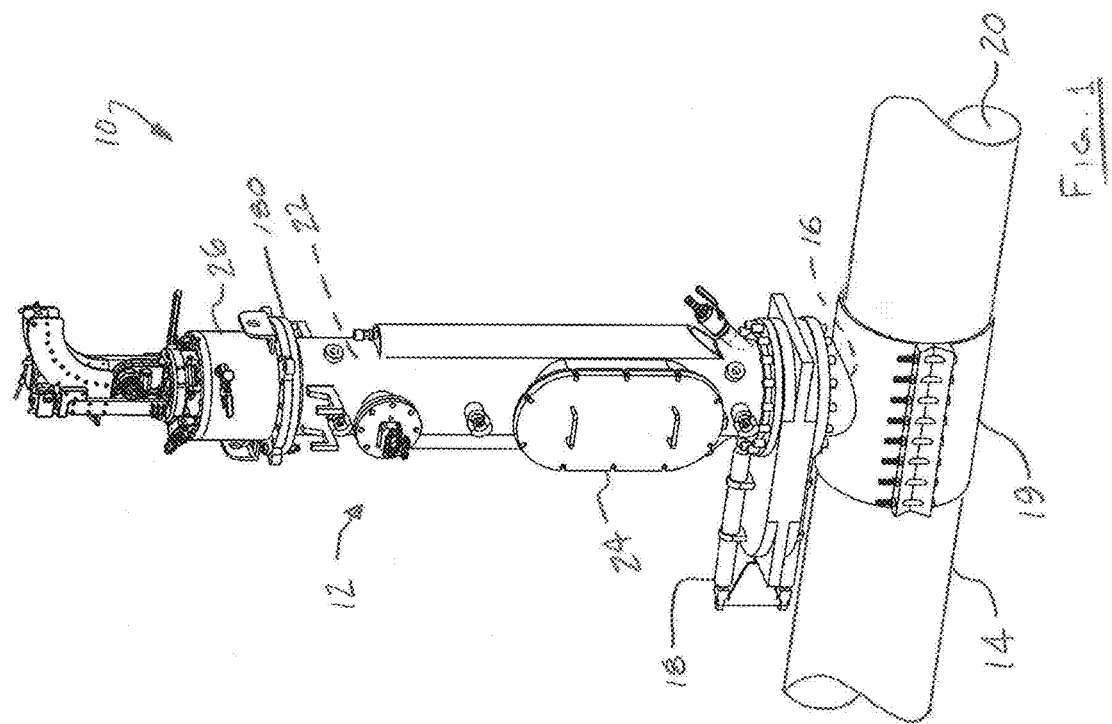

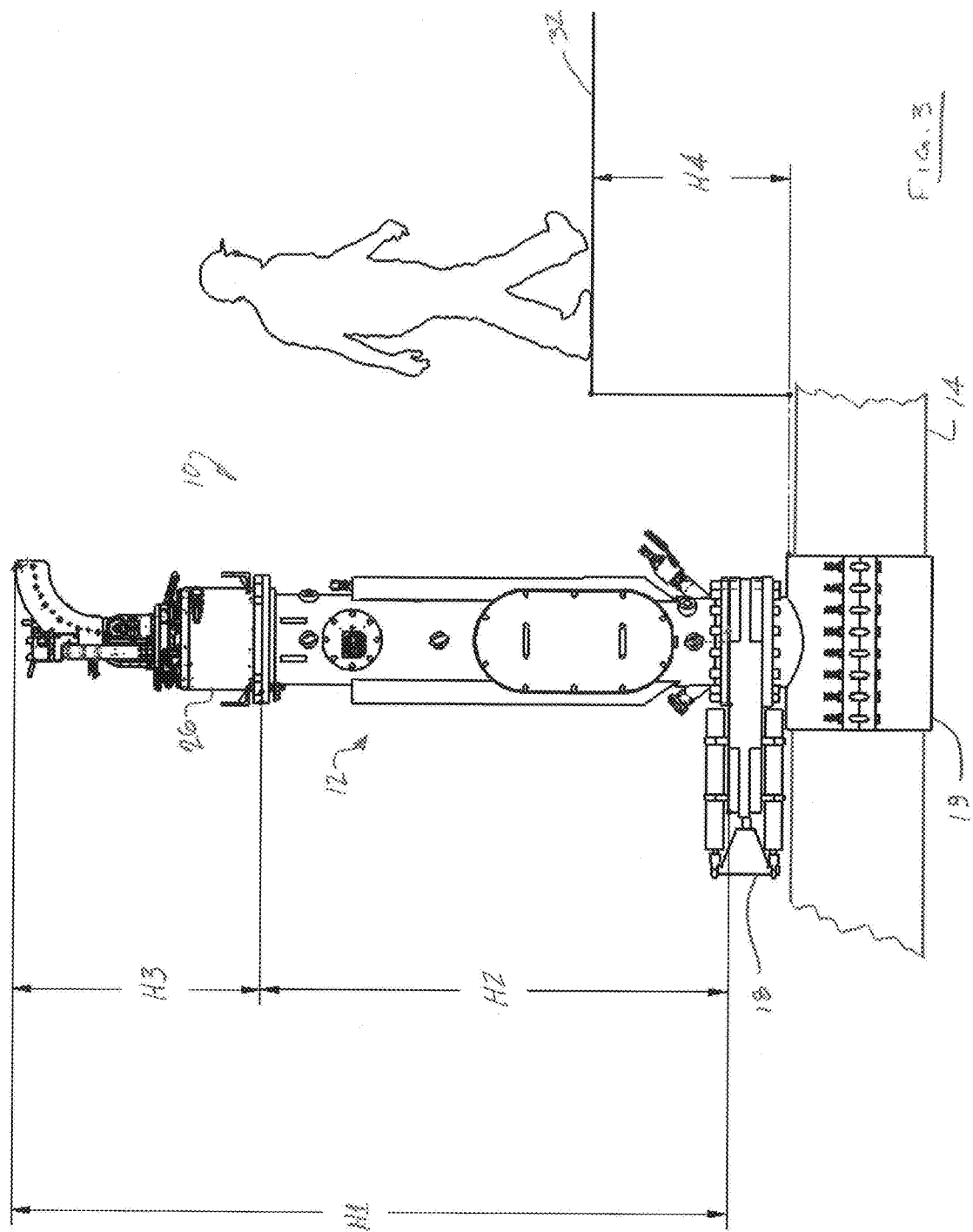

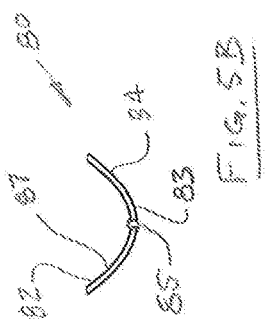
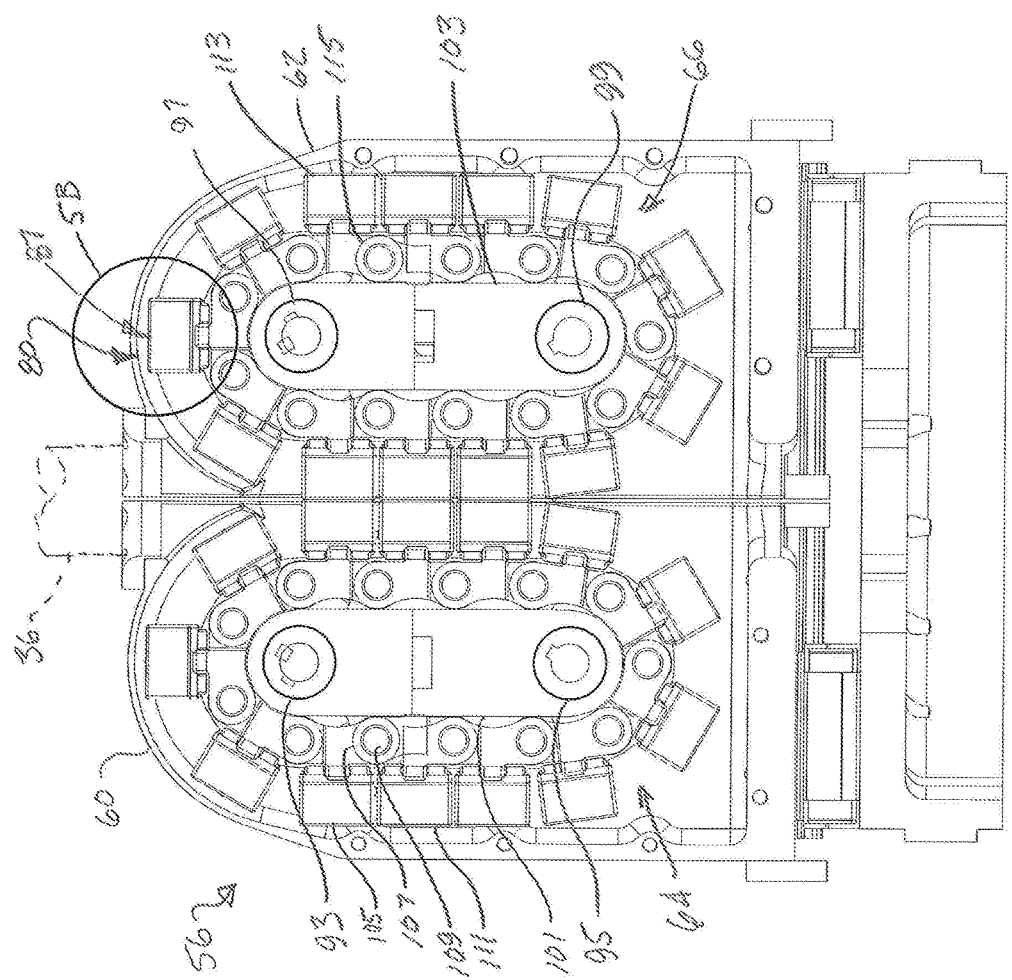

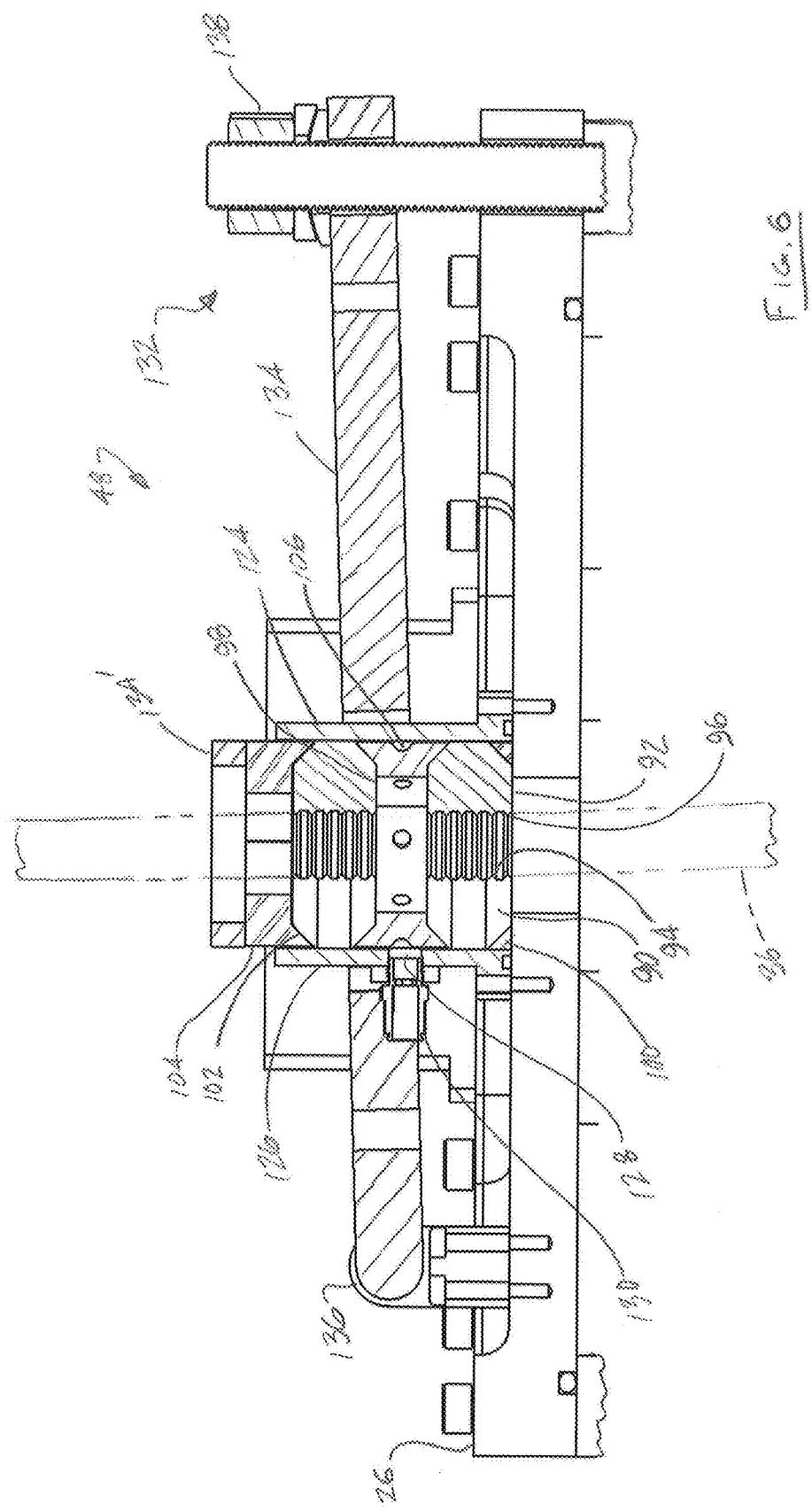

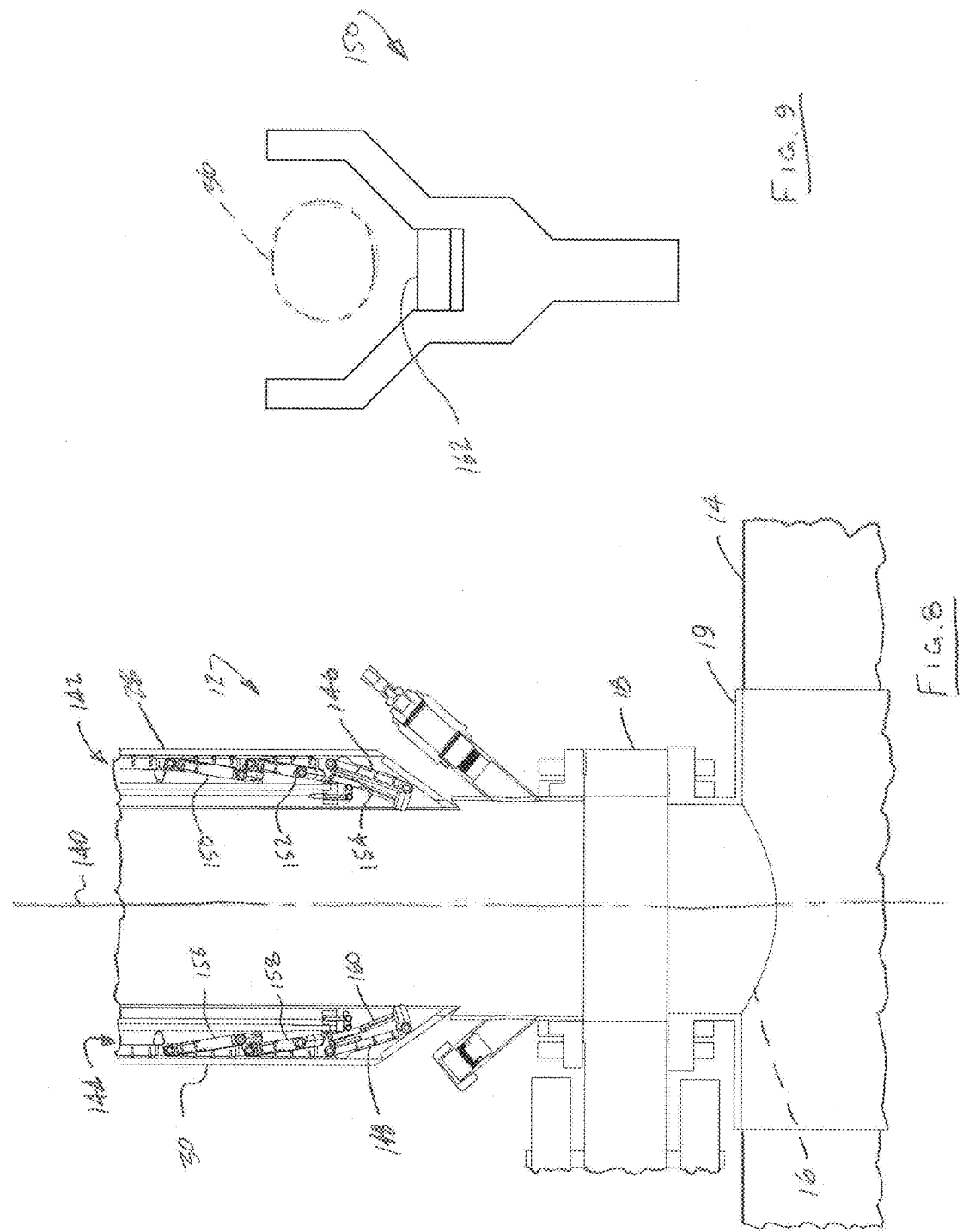

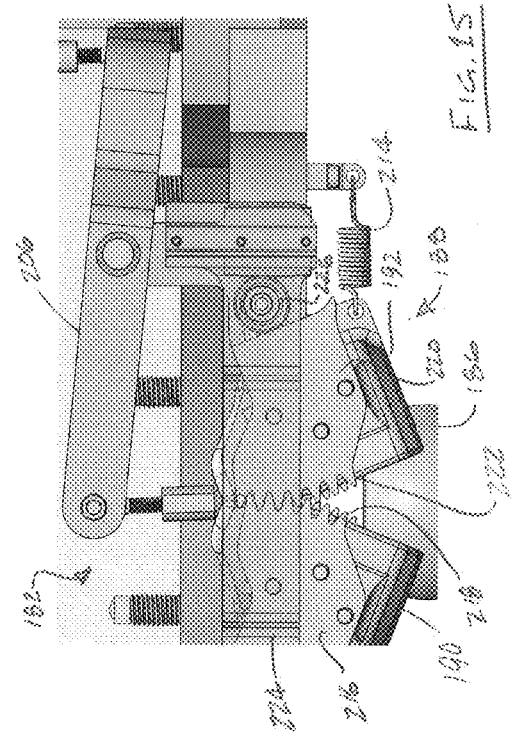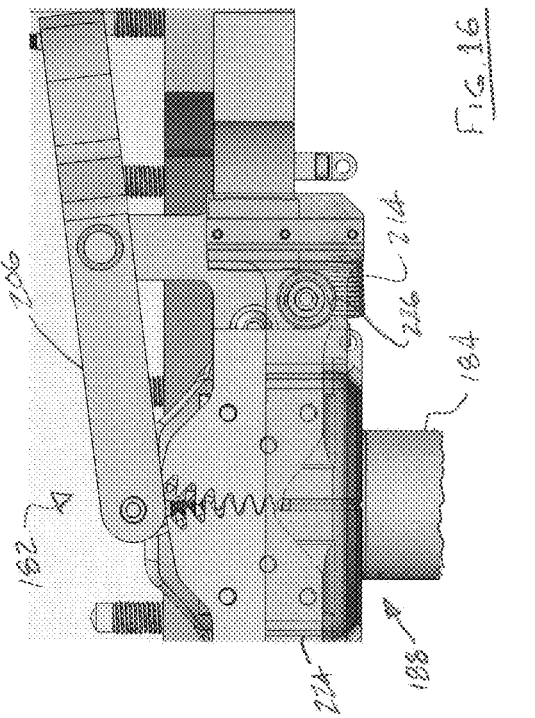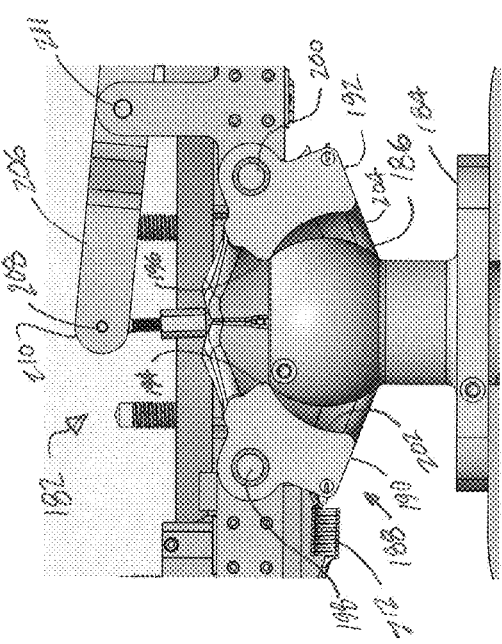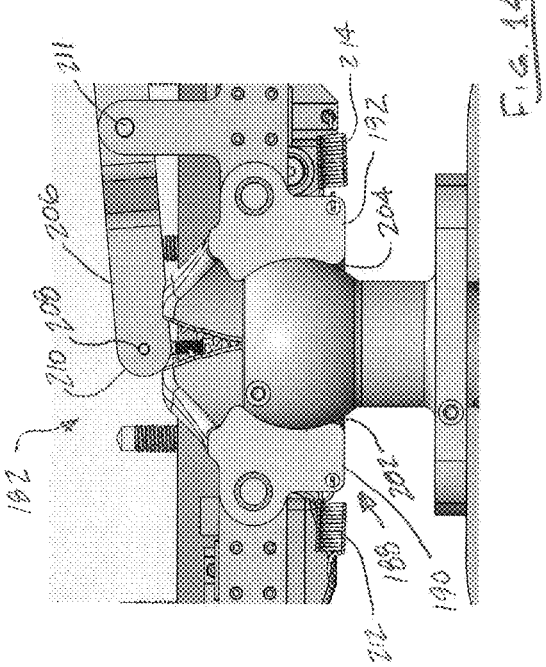

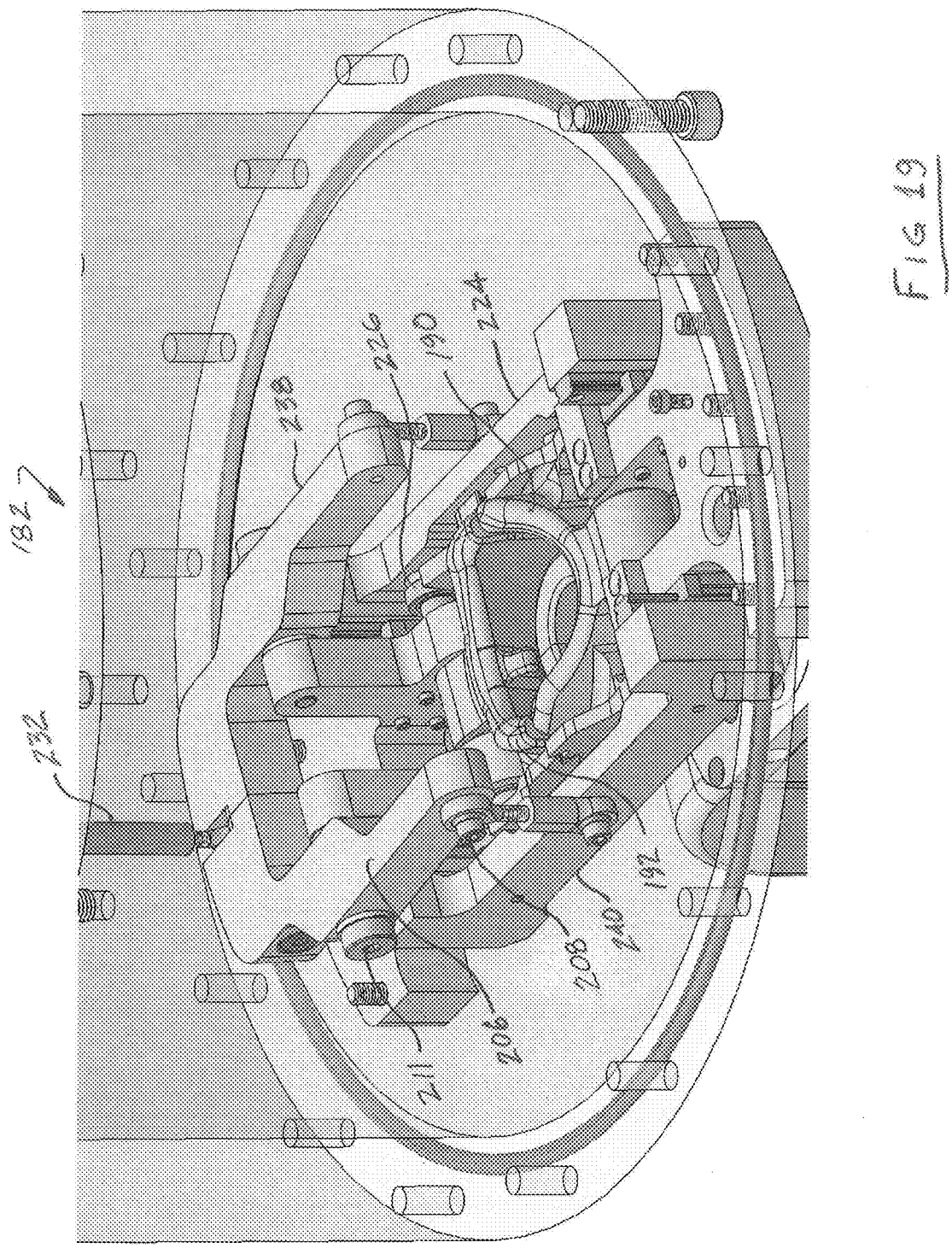

LAUNCH SYSTEM FOR A PRESSURIZED PIPELINE

CROSS-REFERENCE TO RELATED APPLICATIONS

This application claims the benefit of U.S. provisional application Ser. No. 62/182,222 filed Jun. 19, 2015, the disclosure of which is hereby incorporated in its entirety by reference herein.

TECHNICAL FIELD

The present disclosure relates to a launch system for a pressurized pipeline.

BACKGROUND

Performing maintenance work on a gas pipeline can often cause an undesirable disruption of service for gas customers. Although some work may be performed while the pipeline is "live"—i.e., the gas is still flowing through the pipeline—other types of work may require a stoppage of gas flow at least through the localized work area. In some cases, because of redundancies in networks, gas may still reach most or all of the gas customers despite the localized stoppage. In cases where there are not sufficient redundancies, however, gas service to a large number of customers may be cut off completely while work on the pipeline is performed. This may be a particular problem where a relatively large opening is required to access the pipeline, and also in cases where a physical connection is required between the outside of the pipeline and the inside of the pipeline while the work is being performed.

One such situation may occur when a pipeline apparatus such as a relatively large robotic device needs to be inserted into the pipeline to perform inspection or repair. Further complicating matters is the situation where a physical connection is required between the robotic device inside the pipeline and another system or device outside the pipeline—e.g., for purposes of communications, power transfer, etc. Although a live gas main can be tapped and have a valve installed over the opening, it may still be difficult to access the pipeline to perform maintenance if the gas is not cut off. It may be desirable, therefore, to have a secondary structure attachable to the pipeline that provides ingress and egress to and from the live gas main.

SUMMARY

An airlock is a device that permits the passage of objects between environments at different pressures while reducing the change of pressure in the vessel and loss of air or other gas from it. In order to operate a tethered robotic device in a pressurized gas pipeline, a specialized type of an airlock may be required. Embodiments described herein may include a launch system operable to function as an airlock between ambient atmospheric air pressure and the internal pressure of a gas pipeline. The launch system may facilitate inserting, operating and retrieving a tethered robotic system in the pressurized gas pipeline.

Embodiments described herein may include a launch system for a pressurized pipeline having a cable feeder system. A housing is attachable to the pipeline such that an inside of the housing is open to an interior of the pipeline and an outside of the housing is exposed to an ambient environment outside the pipeline. A first actuator arrangement is disposed on the outside of the housing, and a second actuator arrangement is disposed on the inside of the housing. A seal arrangement is disposed in the housing between the first actuator arrangement and the second actuator arrangement. Each of the first and second actuator arrangements is configured to receive a cable having a portion extending outside the housing, a portion extending through the seal arrangement, and a portion extending inside the housing. The actuator arrangements are independently operable to pull the cable relative to the seal arrangement for moving the cable into and out of the pipeline.

Embodiments described herein may include a launch system for a pressurized pipeline having a cable feeder system. A housing is attachable to the pipeline such that an inside of the housing is in fluid communication with an interior of the pipeline. The housing includes a seal arrangement configured to engage a cable extending from outside the pipeline to inside the pipeline such that release of pressurized gas from inside the pipeline to an ambient environment outside the pipeline is inhibited. A first actuator arrangement is disposed on one side of the seal arrangement and configured to receive a portion of the cable outside the housing. The first actuator arrangement is operable to pull the cable through the seal arrangement and out of the pipeline. A second actuator arrangement is disposed on another side of the seal arrangement and configured to receive a portion of the cable inside the housing. The second actuator arrangement is operable to pull the cable through the seal arrangement and into the pipeline.

Embodiments described herein may include a launch system for a pressurized pipeline having a cable feeder system. A housing includes a seal arrangement configured to engage a cable extending from outside the pipeline to inside the pipeline such that release of pressurized gas from inside the pipeline to an ambient environment outside the pipeline through the seal arrangement is inhibited. A first actuator arrangement is disposed on one side of the seal arrangement and configured to receive a portion of the cable outside the housing. A second actuator arrangement is disposed on another side of the seal arrangement and configured to receive a portion of the cable inside the housing. Each of the first and second actuator arrangements includes a plurality of jaws having an open position and a closed position. Each of the first and second actuator arrangements is operable to pull the cable through the seal arrangement when its respective jaws are in the closed position.

Embodiments described herein may include a launch system for a pressurized pipeline having a seal arrangement. An annular seal is attachable to the pipeline such that at least a portion of a first side of the seal is exposed to pressurized gas inside the pipeline. The seal includes an aperture disposed therethrough for engaging a cable at a seal-cable interface. The seal is configured to inhibit pressurized gas from inside the pipeline from being released through the seal-cable interface when the seal is attached to the pipeline and the cable extends from outside the pipeline to inside the pipeline. An annular vent contacts the seal to receive gas passing through the seal-cable interface and direct the gas to a predetermined location.

Embodiments described herein may include a launch system for a pressurized pipeline having a seal arrangement. A chamber is attachable to the pipeline such that an open end of the chamber is in fluid communication with an interior of the pipeline. A seal is disposed in the chamber such that at least a portion of a first side of the seal is exposed to pressurized gas inside the pipeline when the chamber is attached to the pipeline. The seal has a second side disposed opposite the first side and a generally cylindrical inside surface sized to contact an outside surface of a cable extending from outside the pipeline to inside the pipeline such that release of the pressurized gas between the inside surface of the seal and the outside surface of the cable is inhibited. A vent is disposed within the chamber adjacent to and contacting the second side of the seal. The vent has a generally cylindrical inside surface sized larger than the inside surface of the seal.

Embodiments described herein may include a launch system for a pressurized pipeline having a seal arrangement. A seal is configured to engage a cable extending from outside the pipeline to inside the pipeline such that release of pressurized gas from inside the pipeline to an ambient environment outside the pipeline through the seal arrangement is inhibited. A vent is disposed axially adjacent to the seal such that it receives gas passing between the seal and the cable, and the vent is configured to direct the received gas to a predetermined location.

Embodiments described herein may include a launch system for a pressurized pipeline having a cable guide. A tube is attachable to the pipeline such that an interior of the tube is in fluid communication with an interior of the pipeline. A guide arrangement is disposed to access the interior of the tube and has a use position when the tube is attached to the pipeline wherein the guide arrangement extends from the interior of the tube into the interior of the pipeline. The guide arrangement further has a stowed position wherein the guide arrangement is disposed in the tube. The guide arrangement includes a first portion configured to be at least partially within the interior of the pipeline when the guide arrangement is in the use position. The first portion is configured to receive a cable extending from the interior of the tube to the interior of the pipeline and to be disposed between the cable and a wall of the pipeline.

Embodiments described herein may include a launch system for a pressurized pipeline having a cable guide. A tube is attachable to the pipeline at an opening in the pipeline such that an interior of the tube is in fluid communication with an interior of the pipeline. A guide arrangement is selectively deployable from and retractable to the interior of the tube through the opening in the pipeline when the tube is attached to the pipeline. The guide arrangement includes a first segment configured to receive a cable extending from the interior of the tube through the opening in the pipeline when the tube is attached to the pipeline. The first segment is positioned between the cable and an edge of the opening in the pipeline.

Embodiments described herein may include a launch system for a pressurized pipeline having a cable guide. A tube is attachable to the pipeline at an opening in the pipeline such that an interior of the tube is in fluid communication with an interior of the pipeline. A guide arrangement includes a first segment pivotably connected to a second segment and has a stowed position wherein the guide arrangement is disposed in the tube and a use position when the tube is attached to the pipeline wherein the guide arrangement extends from within the tube through the opening in the pipeline and the first segment covers a portion of an edge of the opening.

Embodiments described herein may include a launch system for a pressurized pipeline having a docking system. A tube is attachable to the pipeline such that an interior of the tube is in fluid communication with an interior of the pipeline. A clamp arrangement includes a clamp disposed within the tube and having a lock position and a release position. The clamp is operable to selectively lock and release a pipeline apparatus in the tube. The clamp arrangement further includes an actuator operable from outside the tube to at least move the clamp from the lock position to the release position.

Embodiments described herein may include a launch system for a pressurized pipeline having a docking system. A tube is attachable to the pipeline at an opening in the pipeline such that an interior of the tube is in fluid communication with an interior of the pipeline. A clamp arrangement is disposed at least partially in the tube and includes a clamp operable to selectively lock and release a pipeline apparatus in the tube and an actuator operable from outside the tube to effect movement of the clamp at least from a lock position to a release position.

Embodiments described herein may include a launch system for a pressurized pipeline having a docking system. A tube is attachable to the pipeline at an opening in the pipeline such that an interior of the tube is in fluid communication with an interior of the pipeline. A clamp is disposed within the tube and operable to lock a pipeline apparatus in the tube and release the pipeline apparatus for travel through the opening and into the pipeline. An actuator is operable from outside the tube to at least effect movement of the clamp from a lock position to a release position.

BRIEF DESCRIPTION OF THE DRAWINGS

FIG. 1 shows a perspective view of a launch system for a pressurized pipeline in accordance with embodiments described herein;

FIG. 2 shows an opposite side of the launch system shown in FIG. 1;

FIG. 3 shows a plan view of the launch system shown in FIG. 1 relative to the road surface and a technician;

FIG. 5A shows a portion of the cable feeder system shown in FIG. 4;

FIG. 5B shows a portion of a movable track shown in FIG. 5A;

FIG. 6 shows a seal arrangement making up a part of the launch system shown in FIG. 1;

FIG. 8 shows a cable guide making up a part of the launch system shown in FIG. 1;

FIG. 9 shows an extendable arm making up a portion of the cable guide shown in FIG. 8;

FIG. 13 shows a portion of the docking system shown in FIG. 12 in a release position as it begins to engage a mating component;

FIG. 14 shows the docking system in a lock position;

FIG. 15 shows the opposite side of the docking system as shown in FIG. 13 in the release position;

FIG. 16 shows the opposite side of the docking system as shown in FIG. 14 in the lock position;

FIG. 19 shows a perspective view of a portion of the docking system, including a clamp arrangement.

DETAILED DESCRIPTION

Figure 4:
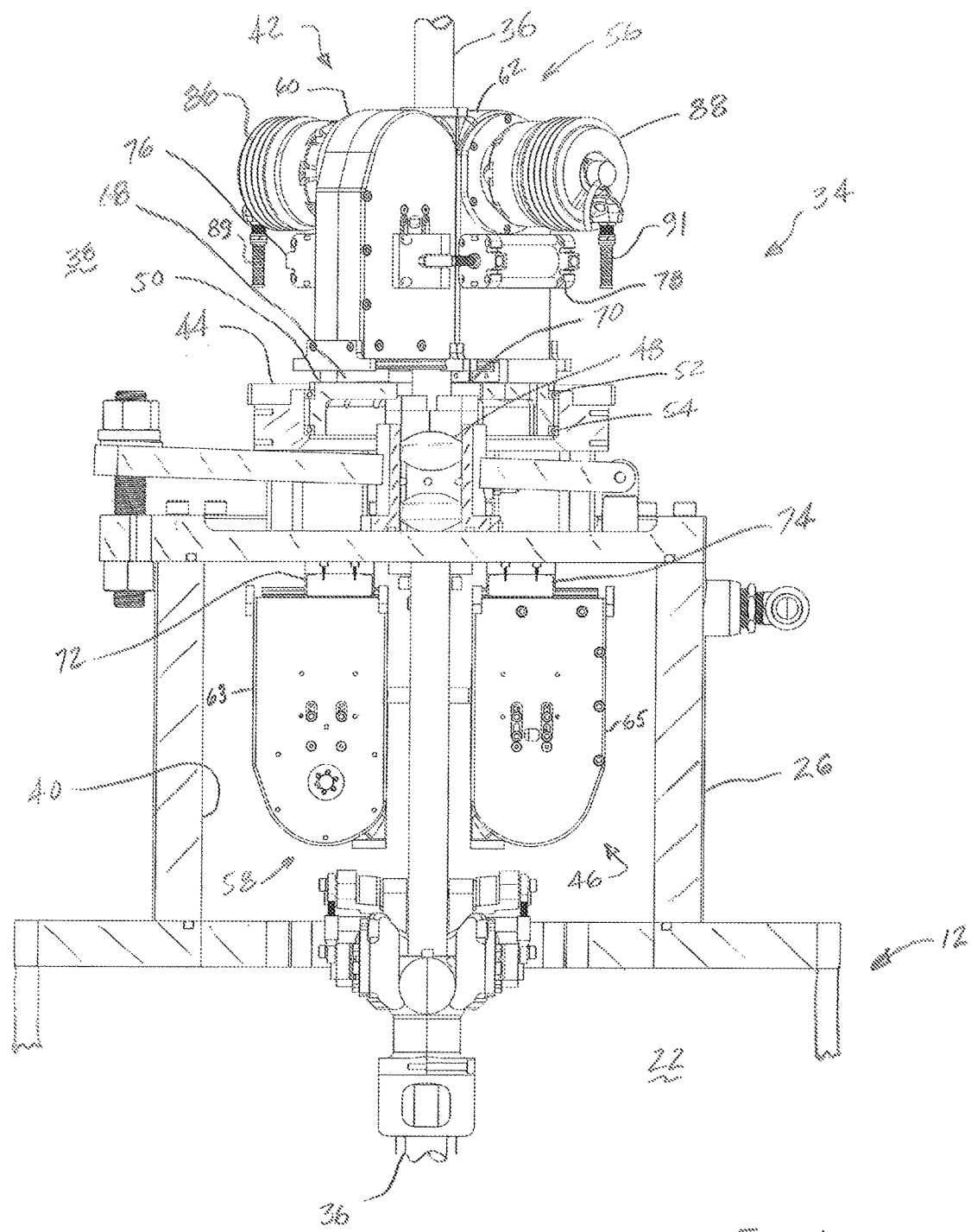
FIG. 4 shows a cable feeder system making up a part of the launch system shown in FIG. 1.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 shows a launch system 10 in accordance with embodiments described herein. Some of the components are labeled and described in conjunction with FIGS. 1 and 2 and are explained in more detail in the subsequent drawing figures. The launch system 10 includes a launch tube 12 that is attachable to a pressurized gas pipeline 14. More specifically, the launch tube 12 is attachable to the pipeline 14 at an opening 16 in the pipeline. As is well known in the art, the opening 16 can be made with a tap system that allows for installation of a valve 18. The valve 18 is attached to a tee fitting 19 that wraps around and seals a portion of the pipeline 14 to allow the pipeline 14 to be drilled while under pressure. The valve 18 allows selective access to an interior 20 of the pipeline 14. In the arrangement shown in FIG. 1, the launch tube 12 is attached to the valve 18 such that when the valve 18 is opened, an interior 22 of the launch tube 12 is in fluid communication with the interior 20 of the pipeline 14.

Although the launch system 10 may be used to facilitate the movement of various apparatuses into and out of the pipeline 14, one use includes launching a robotic device into the pipeline 14 for inspection, repair, or both. In the embodiment shown in FIG. 1, the launch tube 12 includes an access hatch 24 which provides convenient access to the interior 22 of the launch tube 12. A housing 26 is disposed near a top of the launch tube 12, and as described in more detail below, houses or partially houses a number of subsystems. Although some robotic devices may be controlled wirelessly, others may include a cable, which can provide electrical power, pneumatic lines for air or nitrogen, communications lines, and even provide a liquid or semi-liquid sealant to that can be used by a repair robot. One such robotic device is described in U.S. patent application number 2015/0316195, published on Nov. 5, 2015, and entitled System and Method for Pipeline Maintenance, which is incorporated herein by reference.

FIG. 2 shows an opposite side of the launch system 10, including a pair of chambers 28, 30 associated with a cable guide as described in more detail below in conjunction with FIGS. 8-11. FIG. 3 shows the launch system 10 relative to a roadway surface 32 on which a technician is standing to provide a general reference for a size of the launch system 10 as shown in the embodiment in FIGS. 1-3. From the valve 18 where the launch tube 12 attaches, the overall height of the launch tube 12 is shown with a dimension (H1). In at least some embodiments, (H1) may be approximately 3 meters (m). A distance from the bottom of the launch tube 12 to the point at which the housing 26 is attached is designated as (H2), and in some embodiments may be approximately 2 m. In the embodiment shown in FIG. 3, the height (H3) is therefore approximately 1 m, and the distance below the road surface 32 to the pipeline 14 is listed as (H4) and may also be on the order of 1 m. Of course other sizes of launch tubes—both larger and smaller—may be used in other embodiments.

When a pipeline apparatus such as a robotic device includes a cable, consideration needs to be made to ensure that the cable is not damaged during the launching of the robot into the pipeline and the removal of the robot from the pipeline. One issue to consider is that the launch system 10 is configured for attachment to a pressurized pipeline; therefore, anything that extends from outside of the pipeline to the inside of the pipeline must pass through a secure seal to ensure that the pressurized gas from the pipeline does not escape. In the case of a robotic device that uses a cable for power, communications, etc., the cable must pass through a seal that inhibits the release of gas from inside the pipeline. Because the seal may necessarily be tight around an outside of the cable, it may not be possible to push a flexible cable into or out of the launch tube 12 and ultimately the pipeline 14. Rather, it may be necessary to pull the cable in whichever direction it is desired to move the robot. To accommodate this, embodiments described herein include a cable feeder system.

FIG. 4 shows a cable feeder system 34 making up a part of the launch tube system 10. FIG. 4 is a partial sectional view showing a portion of the housing 26, and illustrating a cable 36 extending from an ambient environment 38 outside the housing 26 to the interior 22 of the launch tube 12. Although it is not shown extending all the way downward, it is understood that the cable 36 extends through the launch tube 12 and into the pipeline 14. As shown in FIG. 4, an inside 40 of the housing 26 is in fluid communication with the interior 22 of the launch tube 12, and is therefore in fluid communication with the interior 20 of the pipeline 14. The cable feeder system 34 includes a first actuator arrangement 42 disposed on an outside 44 of the housing 26. It further includes a second actuator arrangement 46 disposed on the inside 40 of the housing 26. A seal arrangement 48 is disposed in the housing 26 between the first and second actuator arrangements 42, 46.

As shown in FIG. 4, the first and second actuator arrangements 42, 46 have different orientations around the cable 36. This is because each of the first and second actuator arrangements 42, 46 are rotatable relative to the housing. For example, the first actuator arrangement 42 is shown mounted on a plate 50 having bearings 52, 54 disposed between it and the housing 26. Although not shown in FIG. 4, it is contemplated that a similar rotation mechanism may be used for the inside actuator arrangement 46. Each of the actuator arrangements 42, 46 is configured to receive a cable, such as the cable 36, and as described in more detail below pull the cable into the launch tube 12 and out of the launch tube 12 through the seal arrangement 48.

In the embodiment shown in FIG. 4, each of the actuator arrangements 42, 46 includes a respective pair of jaws 56, 58. The pair 56 includes jaws 60, 62, while the pair 58 includes jaws 63, 65. Each pair of jaws 56, 58 has an open position for receiving a cable and a closed position for securing the cable. In the embodiment shown in FIG. 4, the inside jaws 58 are shown in the open position, while the outside jaws 56 are shown in the closed position. Although the embodiment shown in FIG. 4 includes two pairs of jaws, more than two jaws may be used for actuators in other embodiments. For example, each of the inside and outside actuators may have three jaws, or it may be desirable to have different numbers of jaws for the actuator on the outside of a housing as compared to the actuator on the inside of the housing. In order to facilitate opening and closing, at least one of the jaws of each pair of jaws is movable relative to the other jaw. In the embodiment shown in FIG. 4, each of the jaws is movable along a track arrangement having at least one linear track. More specifically, the jaw 60 opens and closes by moving along a linear track 68, while the jaw 62 opens and closes by moving along a linear track 70. Similarly, the jaw 63 opens and closes by moving along a linear track 72 while the jaw 65 opens and closes by moving along a linear track 74.

Although there are any number of ways in which actuators, such as the actuators 56, 58 may be opened and closed, in the embodiment shown in FIG. 4, pneumatic cylinders 76, 78 are used. The pneumatic cylinders 76, 78 are shown on either side of the actuator 56, and although not shown on the inside 40 of the housing 26, it is understood that the inside actuator 58 also includes a pair of pneumatic cylinders for opening and closing them around a cable. As described above, a flexible cable, such as the cable 36, may be difficult or impossible to push through a tight seal, such as the seal arrangement 48. Therefore, in order to move the cable 36—and any pipeline apparatus such as the robotic system—into the pipeline, the lower actuator 58 closes while the upper actuator 56 opens, and then the lower actuator pulls the cable 36 through the seal arrangement 48 and down into the launch tube 12 and ultimately the pipeline 14. The opposite situation is shown in FIG. 4, where the upper actuator 56 is closed and the lower actuator 58 is open, which is the orientation used when the cable 36 is to be pulled out of the pipeline 14.

In order to effect movement of a cable, such as the cable 36 through the actuators 56, 58, they are each configured with a movable track that engages the cable when the respective jaws are in the closed position. FIG. 5A shows a partial cutaway view of the actuator 56 so a portion of the inside of the jaws 60, 62 can be seen. As shown in FIG. 5A, each of the jaws 60, 62 includes a movable track 64, 66 made up of a number of segmented links. One of the links 80 is partially shown in a side view in FIG. 5B. The link 80 is generally arcuate in shape and is configured to receive a cable, and more particularly, is sized to mate with an outside of a cable, such as the cable 36. As shown in FIG. 5B, the link 80 is made up of two separate arcuate portions 82, 84, which is connected by a hinge 85 that allows the link 80 to partially wrap around a cable when the cable is received in the concave side 87 of the link 80. Each of the links in the movable tracks 64, 66 is configured the same as the link 80, although in other embodiments, some of the links may be configured differently. For example, not all of the links need to have a hinge between their segments, nor do they even need to have multiple segments.

The movable tracks 64, 66 are driven by motors 86, 88—see FIG. 4. Also shown in FIG. 4 are partial power cords 89, 91, which are not shown in their entirety, but which connect to a source of electrical power to operate the motors 86, 88. As described above, a cable, such as the cable 36 is pulled into and out of the launch tube 12 by the feeder system 34. In the embodiment shown in FIG. 5A, the movable tracks 64, 66 are used to move the cable 36, and are made up of pivoting links, such as the link 80 described above. As shown in FIG. 5A, the links are formed as a flexible chain that rotates under the power of the motors 86, 88. In many belt or chain drive systems, very little force is exerted against an object in the middle of the belt or chain where there is no support. For example, the movable track 64 includes two rollers 93, 95 disposed near the limits of their movement. Similarly, the movable track 66 includes rollers 97, 99. These rollers provide support for their respective tracks 64, 66 to firmly grip the cable 36 at positions directly opposite the rollers; this is the situation for many belt or chain drive systems.

Because it is desirable to firmly grip the cable 36 throughout the entire length of the tracks 64, 66, the embodiment shown in FIG. 5A provides additional support structures. Specifically, the jaw 60 includes a central support structure 101 and the jaw 62 includes a central support structure 103. The support structures 101, 103 are disposed adjacent to the links on a convex side—see convex side 83 of the link 80 in FIG. 5B—and provide a reaction force to the links when the cable applies a force to a concave side of the links.

Illustrated on one of the links 105 is a bearing 107 that is disposed around the pivoting connection 109 between the link 105 and its adjacent link 111. Although not shown in FIG. 5A, it is understood that some or all of the other links of the movable track 64 may have similar bearings attached to them. The bearing 107 rides along a surface of the central support member 101 and as the cable 36 is gripped within the concave portion of the links and applies a force to the links, the central support member 101 provides a reaction force from the convex side of the links. A similar exemplary link 113 is shown on the movable track 66. It also includes a bearing 115 configured to ride along the central support 103, which provides a reaction force when the cable 36 is gripped and moved by the links.

Turning to FIG. 6, the seal arrangement 48 is shown in more detail. Specifically, the seal arrangement 48 is disposed on a portion of the housing 26 and includes an annular seal 90 having a first side 92 that is exposed to the pressurized gas from the pipeline 14 when the launch tube 12 is connected to the pipeline 14 and the valve 18 is open. The seal 90 includes an aperture 94 disposed therethrough for engaging a cable, such as the cable 36, which is shown in phantom in FIG. 6. The seal 90 is sized such that as the cable 36 passes through the aperture 94, and pressure is applied to the seal 90, the release of pressurized gas from inside the pipeline at a seal-cable interface 96 is inhibited. As used herein, "inhibited" does not necessarily mean that no gas escapes, but rather that the release of gas through this interface is either completely prohibited or only a small amount passes through.

Figure 7:
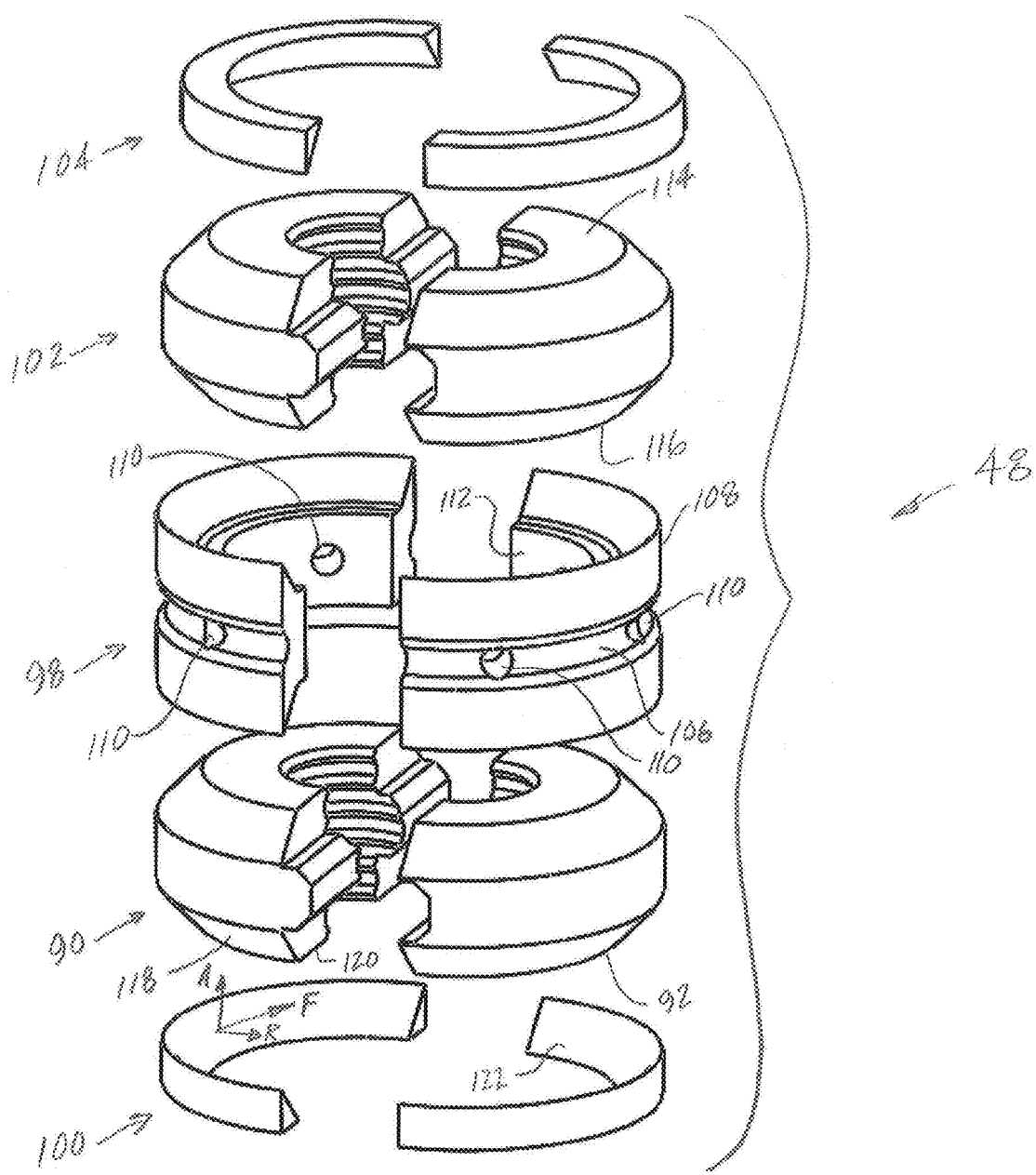
FIG. 7 shows an exploded view of a portion of the seal arrangement shown in FIG. 6.

In anticipation of the situation where a small amount of gas may pass through the seal 90, the seal arrangement 48 also includes an annular vent 98 which receives gas passing through the seal-cable interface 96 and directs the gas to a predetermined location—e.g., to a location outside of the launch tube 12 where it may be safely vented. FIG. 7 shows an exploded view of several components of the seal arrangement 48. In particular, the seal 90 and the vent 98 are both shown. In addition, there is compression ring 100, which is disposed below the seal 90 and is configured to contact the first surface 92 of the seal 90. The seal arrangement 48 further includes a secondary seal 102 and a secondary compression ring 104. In the embodiment illustrated in FIG. 7, each of the components 90, 98, 100, 102, 104 is configured as two separate pieces. This may be convenient for installing the seal arrangement 48, but is not required, and in other embodiments one or more of these components may be a single piece.

As shown in FIG. 7, the vent 98 includes a channel 106 disposed around an outside surface 108 of the vent 98. The channel 106 includes a plurality of apertures, each of which is labeled 110 for convenience that are disposed in the channel 106 and through an inside surface 112 of the vent 98. Although the channel 106 goes around the entire outside surface 108 of the vent 98, other embodiments may include a channel of much shorter length, or even a vent having no channel at all. The secondary seal 102 includes a first side 114 and a second side 116 disposed opposite the first side 114 and adjacent to and contacting the vent 98. As shown in FIG. 7, the first side 92 of the seal 90 includes an outer perimeter 118 that is formed at an angle to a bottom surface 120. The compression ring 100 also includes an angled surface 122 configured to mate with the perimeter 118 of the seal 90. In particular, the compression ring 100 and the perimeter 118 of the seal 90 are angled such that when the seal 90 is axially compressed—in a vertical direction as shown in FIG. 7—the compression ring imparts an axial force and a radial force to the seal 90. When the seal 90 is compressed into the compression ring 100, a force (F) is directed perpendicularly to the contacting surface 122 of the compression ring 100. As shown in FIG. 7, the force (F) can be resolved into two components, and axial force component (A) and a radial force component (R). The same configuration and analysis is applicable to the secondary seal 102 and the secondary compression ring 104.

Returning to FIG. 6, the components of the seal arrangement 48 shown in FIG. 7 are shown in an assembled view, wherein they are disposed within a chamber 124. As shown in FIG. 7, the outside surface 108 of the vent 98 is in sealing contact with a wall 126 of the chamber 124. The wall 126 includes an aperture 128 disposed therethrough, which is in fluid communication with the channel 106 of the vent 98. The aperture 128 provides egress for gas passing through the first seal 90 and into the vent 98. As shown in FIG. 6, a fitting 130 is attached to the aperture 128, and from the fitting 130 tubing may be employed to route the gas to a predetermined location away from the work area.

As described above, applying a compressive force to the seal 90, and even the secondary seal 102, provides for a tighter fit with a cable, such as the cable 36, passing through the seal arrangement 48. In order to effect a compressive force, embodiments may also include a compression nut arrangement 132 shown in FIG. 6. The compression nut arrangement 132 includes a compression arm 134 that is pivotally attached to the housing 26 at a pivot point 136. On another end of the compression arm 134 is a threaded nut 138 configured to move the compression arm 134 generally downward or to allow upward movement. Behind the chamber 124, the compression arm 134 is attached to a compression member 134'. The compression member 134' is provided with the same number as the compression arm 134, because in some embodiments it may be a single integrated piece; in other embodiments it may be a separate piece attached to the compression arm 134.

As the compression nut 138 is rotated to move the compression arm 134 downward, the compression member 134' also moves downward onto the secondary compression ring 104, which compresses all of the elements in the chamber 124, including both seals 98, 102. As noted above, this helps to further engage a cable, such as the cable 36 and to further inhibit any release of gas through the seal arrangement 48. With the arrangement of the compression nut 138 and the compression arm 134, a number of advantages may be realized. For example, the area around the chamber 124 includes a great many components, including the cable 36 disposed centrally through the entire assembly. If the compression nut 138 were simply positioned on top of the secondary compression ring 104, it would be difficult if not impossible to make adjustments. In the embodiment shown in FIG. 6, however, having the compression nut 138 disposed at a distance from the central portion of the chamber 124 provides easy access to the compression nut 138 for adjustment of the compression. In addition, it may be desired to have a very high amount of force exerted on the seals in order to securely engage the cable 36. The use of the compression arm 134 provides a mechanical advantage over a nut that is disposed directly on top of the chamber 124.

As noted above, a launch system, such as the launch system 10, may be used to facilitate ingress and egress of a system such as a robot, which may have a cable connecting it to the ambient environment outside of the pipeline. As an apparatus such as the robot travels down the length of the pipeline, the cable may naturally tension, particularly because of the tight fit through a seal where it enters into a launch tube. In such case, the cable may be brought to bear against an inside of the pipeline, and more particularly, may come in contact with a very sharp edge at the opening of the pipeline where it was drilled to accommodate the valve. Embodiments described herein may include a cable guide to further protect the cable as a system such as the robot enters and exits the pipeline.

FIG. 8 shows a portion of the launch tube 12 attached to the valve 18, which is attached to the pipeline 14 at the opening 16. Also shown in FIG. 8, are the chambers 28, 30, which extend along a length of the launch tube 12 and radially outward from a center of the launch tube 12, which is generally indicated by the longitudinal axis 140. Each of the chambers 28, 30 respectively houses a guide arrangement 142, 144, disposed diametrically from each other, and shown in their stowed positions in FIG. 8. A first of the guide arrangement 142 is made up of a number of segments, including a first segment 146, which is the lower or distal most segment of the guide arrangement 142. Similarly, the second guide arrangement 144 has a first segment 148 and a plurality of other segments making up the second guide arrangement 144. In the embodiment shown in FIG. 8, each of the guide arrangements 142, 144 includes a plurality of elongate members.

The first guide arrangement 142 includes elongate members, or guide arms, 150, 152, 154; while the second guide arrangement 144 includes guide arms 156, 158, 160. With each of the guide arrangements 142, 144 in the stowed position, the guide arms 150-160 are disposed generally longitudinally in their respective chamber 28, 30. Although use of the guide arms is illustrated in more detail in FIG. 11, one of the guide arms 150 is shown in detail in FIG. 9. The guide arm 150 is generally "Y" shaped, and is configured to guide a cable, such as the cable 36 shown in phantom in FIG. 9. Depending on the position of a cable, such as the cable 36, the guide arm 50 may or may not come into direct contact with it; however, if it does, the guide arm 150 includes a roller 162 to help facilitate easy movement of the cable into and out of the launch tube. Although the other guide arms 152, 154 of the first guide arrangement 142 may be configured similarly to the guide arm 150, they may also have different configurations, depending on the requirements of the design.

Figure 10:
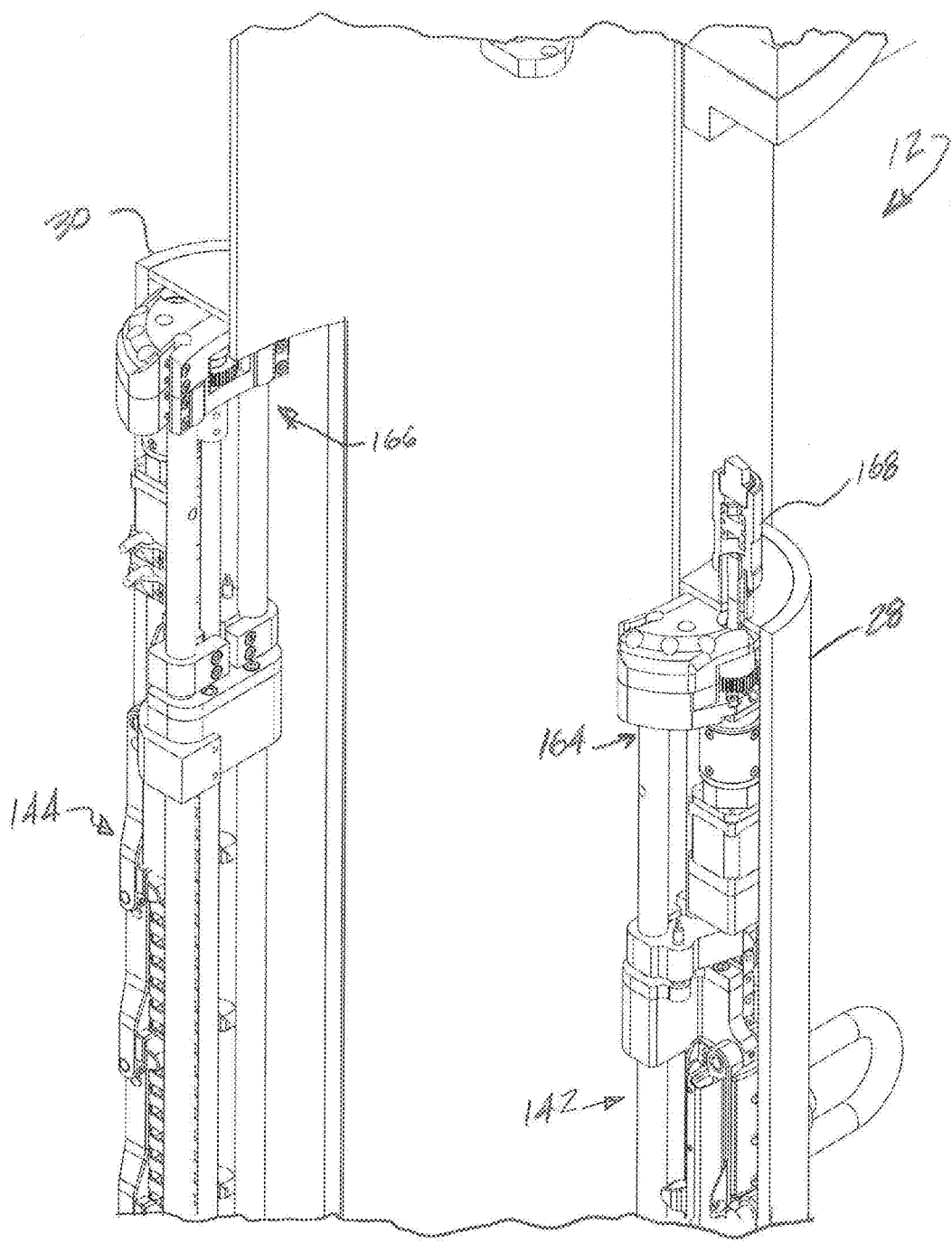
FIG. 10 shows a partial cutaway view of the cable guide shown in FIG. 8.

FIG. 10 shows a portion of the launch tube 12, and in particular a partial cutaway view of the chambers 28, 30. As shown in FIG. 10, the first and second guide arrangements 142, 144 are at least partially deployed, and have moved downward along the launch tube 12. In order to effect the upward and downward movement of the guide arrangements 142, 144, separate motor and screw-drive systems 164, 166 are provided. Also shown in FIG. 10, is an access port 168, which may be used in the event of power failure or other anomaly in order to manually access and retrieve the guide arrangement 142 from the interior of the pipeline, which is where they are partially located when they are in their use position. Although not shown in FIG. 10, another access port, such as the access port 168, will be located at the top of the chamber 30 to provide access to the guide arrangement 144.

Figure 11:
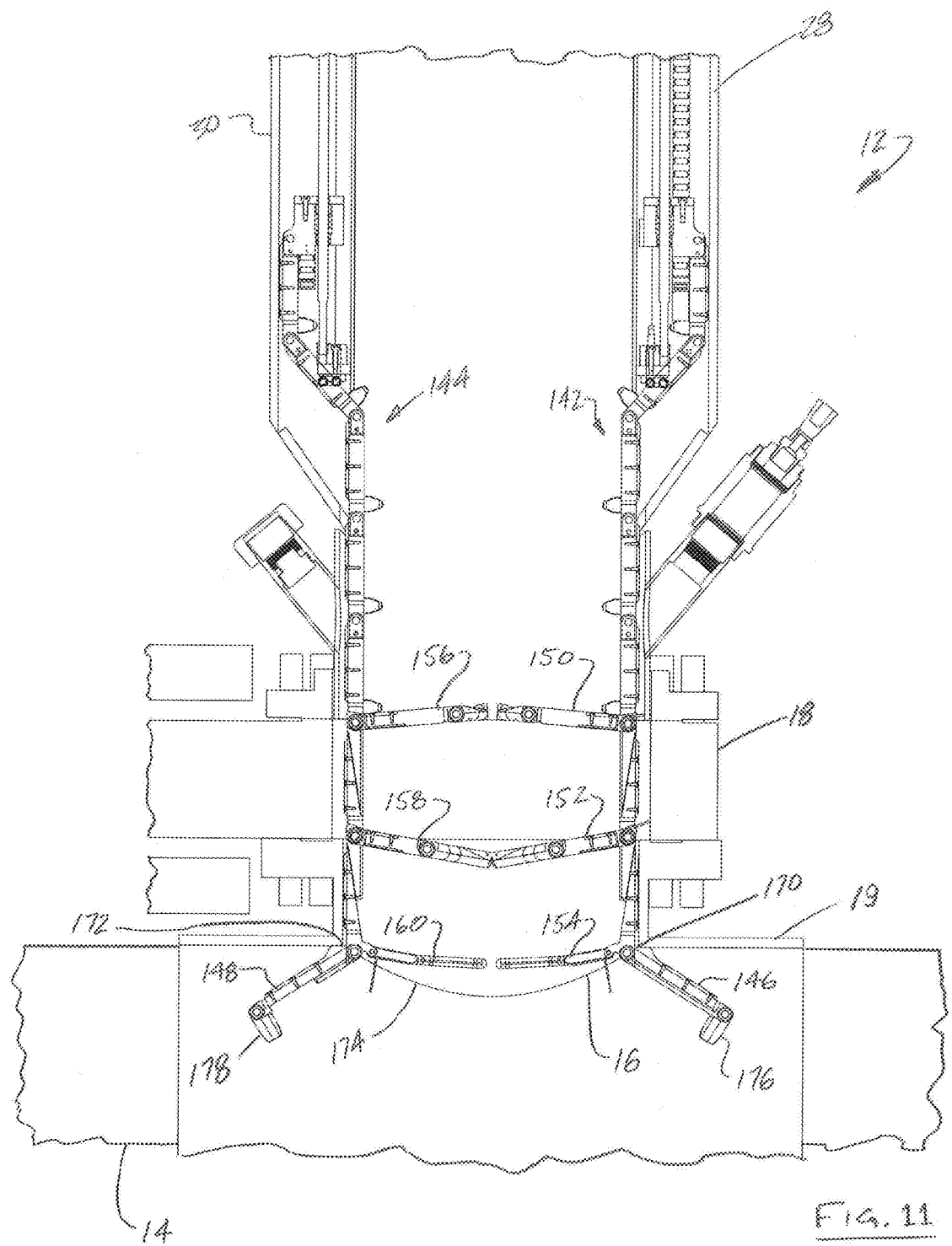
FIG. 11 shows the cable guide in a use position.

FIG. 11 shows each of the guide arrangements 142, 144 fully deployed and in their use positions. The guide arms 150-160 are no longer disposed in a longitudinal orientation as they were in the stowed position, but rather, are now positioned radially outward toward a center of the launch tube 12. This happens automatically as the screw-drive mechanisms 164, 166 move the guide arrangements 142, 144 downward and out of their respective chambers 28, 30. Each of the arms 150-160 is spring-loaded and automatically assumes the generally radial orientation shown in FIG. 11. When the guide arrangements 142, 144 are in their use positions, their respective first portions, or first segments 146, 148, are disposed at least substantially within the pipeline 14, and respectively cover portions 170, 172 of an edge 174 of the opening 16 in the pipeline 14. In the embodiment shown in FIG. 11, each of the first segments 146, 148 includes a respective camera, which is embedded therein, but not visible in the drawing figure. Lights may also be included in the first segments 146, 148 to assist the cameras in viewing the inside 20 of the pipeline 14.

At the end of the segment 146 is a guide 176, and at the end of the segment 148 is a guide 178. The guides 176, 178 may, for example, include rollers or other features to facilitate movement of the cable along its respective guide arrangement 142, 144. In FIG. 11, both of the segments 146, 148 are shown at an angle somewhere between vertical and horizontal. They are illustrated in this position to show an approximation of their orientation when a cable is disposed through their respective guides 176, 178. In practice, the segments 146, 148 are essentially vertical when the guide arrangements 142 144 are deployed into the pipeline 14. It is only when a cable is in contact with them—for example, in contact with their respective guides 176, 178—that the segments 146, 148 assume the orientation shown in FIG. 11.

When a cabled device, such as a robotic system is launched through the launch tube 12 and into a pipeline, such as the pipeline 14, it will be deployed in one direction down the pipeline—e.g., left or right as shown in FIG. 11. Thus, the cable will rely on one of the sets of guide arms, for example, the guide arms 150, 152, 154 if the robot is traveling down the pipeline 14 toward the right. The cable will not only be kept from contacting the edge 174 of the opening 16, but will also be maintained in a curved orientation at or above a minimum desired radius. As noted above, such a cable may include any of a number of different electrical, pneumatic or fluid lines within it, and in order to function it may be required to maintain a minimum radius of curvature. The guide arrangements 142, 144 help to ensure this requirement is met. If, as described above, a robotic system is traveling down the pipeline 14 to the right as it is oriented in FIG. 11, the camera in the segment 148 may be conveniently manipulated to view the interior 20 of the pipeline 14 along the length of the pipeline where the robotic system is deployed. When the robot is traveling in the other direction away from the opening 16, the camera in the segment 146 may be conveniently used.

As described in conjunction with FIG. 3, a launch tube, such as launch tube 12 is quite large—in one embodiment, approximately 3 m in height and a half a meter in diameter. Therefore, it may be necessary to insert a pipeline apparatus, such as a robotic system into the launch tube 12 while it is in a horizontal position, and then use a crane or other heavy equipment to lift the launch tube 12 vertically into place for attachment to a pipeline, such as the pipeline 14. During this time, the robotic system may undesirably move about the interior 22 of the launch tube 12. In the case where the robotic system is cabled, the cable extends outside of the launch tube 12 through the seal arrangement 48, and this may put a great deal of pressure on the cable, particularly if the robotic system is heavy. Therefore, whether the device being launched into the pipeline has a cable or is completely controlled and communicated wirelessly, it is desirable to have a system for holding the apparatus in place in the launch tube while the launch tube is being placed onto the opening in the pipeline.

Figure 12:
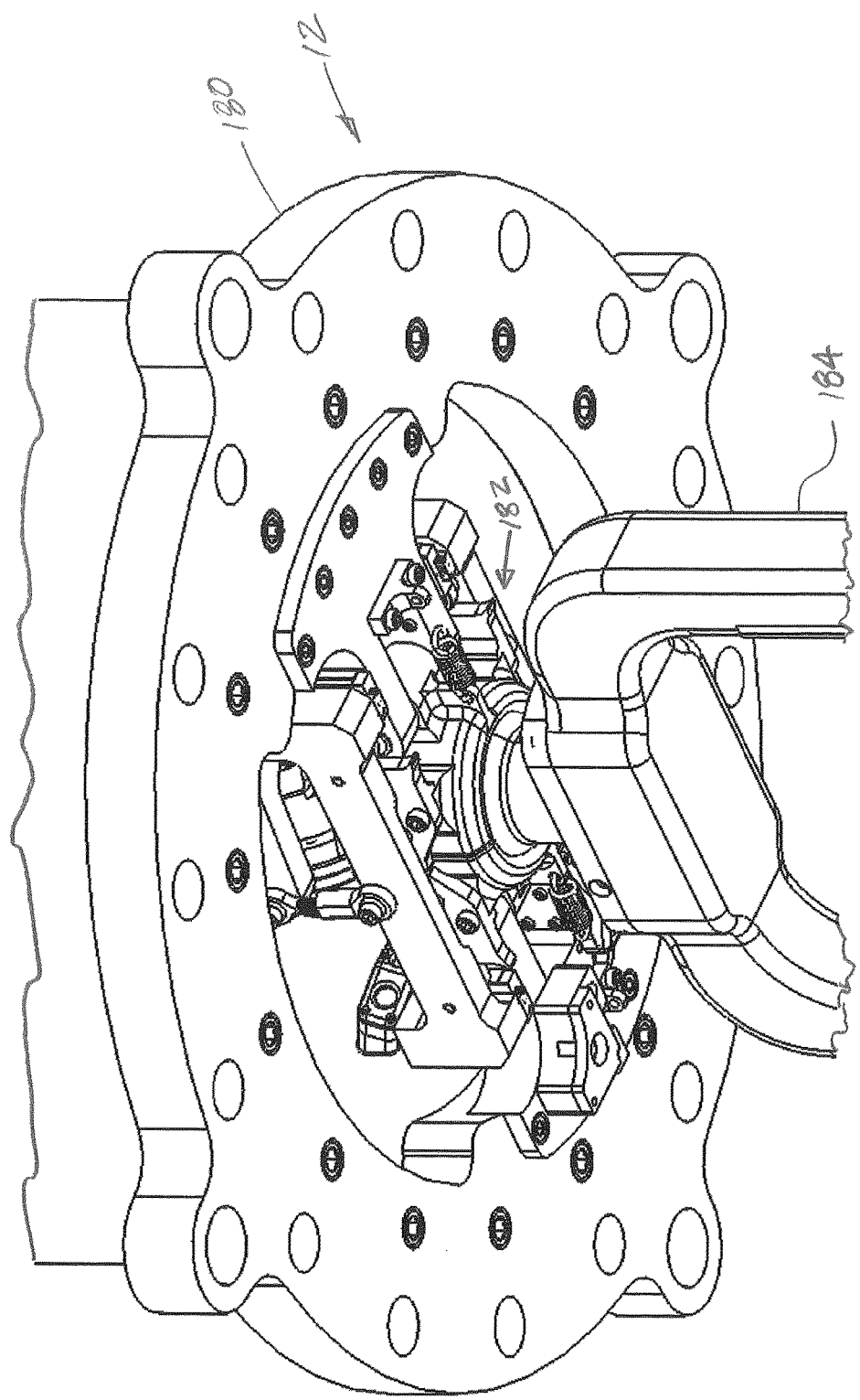
FIG. 12 shows a perspective view of a docking system making up a part of the launch system shown in FIG. 1.

FIG. 12 shows an upper portion 180 of the launch tube 12. Positioned at this upper portion 180 is a clamp arrangement 182. The clamp arrangement 182 is configured to selectively lock and release a portion of a pipeline apparatus, such as a robotic system. A portion of a frame 184 for a robotic system is illustrated in FIG. 12 locked into position in the clamp arrangement 182. FIGS. 13 and 14 show a partial cut view of the clamp arrangement 182 in a release position and a lock position, respectively. Similarly, FIGS. 15 and 16 show a partial cut view of the clamp arrangement 182 in a release position and a lock position, respectively, but having additional features visible.

FIG. 13 shows a portion of the frame 184, including a generally convex portion 186 configured similarly to a ball hitch. A portion of the clamp arrangement 182 is also shown. The clamp arrangement 182 includes a clamp 188, which, as can be seen in FIG. 12, is disposed within the launch tube 12. As shown in FIG. 13, the clamp 188 is in a release position, in which the frame 184 is released. In order to move the clamp 188 to the lock position as shown in FIG. 14, the convex portion 186 is moved upward to contact to jaws 190, 192 forming a part of the clamp 188. Specifically, each of the jaws includes a proximal eminence 194, 196, respectively. Because the jaw 190 pivots at a pivot point 198 and the jaw 192 pivots at a pivot point 200, they begin to engage the convex portion 186 when the convex portion 186 contacts the proximal eminences 194, 196. As shown in FIG. 13, each of the jaws 190, 192 includes a respective concave clamping surface 202, 204, which cooperates with the convex portion 186 of the frame 184.

Also shown in FIGS. 13 and 14 is a lever arm 206, which is pivotably attached to a slider bar behind the clamp 188—this is explained in more detail below and illustrated in FIG. 19. When the clamp 188 is in the release position as shown in FIG. 13, a pivot point 208 at an end 210 of the lever arm 206 is above a pivot point 211 of a mid-portion of the lever arm 206. Conversely, as shown in FIG. 14, the pivot point 208 is below the pivot point 211 when the clamp 188 is in the lock position. As shown in FIG. 14, the lever arm 206 is in an over-center position, which helps to secure the clamp 188 in the lock position and inhibit movement of the clamp 188 from the lock position to the release position by a backdrive force. FIG. 14 also shows two tension springs 212, 214 which help to keep the jaws 191, 192 open when they are in the release position such as shown in FIG. 13—although only one of the springs 212 is shown in that figure.

With the configuration shown in FIGS. 13 and 14, the interaction between the clamp 188 and the convex portion 186 of the frame 184 is such that in the locked position, pivoting of the convex portion 186 is facilitated, while translation of the convex portion 186 is inhibited. This configuration may be desirable when the frame 184 is attached to a very heavy object, such as a complicated inspection or repair robot. Allowing some pivoting movement reduces the stress on the frame 184. In other embodiments, clamp arrangements, such as the clamp arrangement 182, may allow for more or less movement of the clamped object.

FIG. 15 shows essentially the same view as shown in FIG. 13, with several additional features illustrated—i.e., fewer of the features have been cut away as compared to FIG. 13. For example, the jaws 190, 192 of the clamp 188 are shown in their entirety. Again, they are shown in the release position, with the convex portion 186 able to move freely in and out from between the jaws 190, 192. As shown in FIG. 15, the jaws 190, 192 are connected to each other to effect a synchronous movement. More specifically, the jaw 190 includes a rack 216 having gear teeth 218, and the jaw 192 includes a rack 220 having gear teeth 222 configured to intermesh with the gear teeth 218. This helps to keep the movement of the jaws 190, 192 synchronous as they go between the lock and release positions—i.e. they move together.

Also shown in FIG. 15 in phantom is a slider bar 224, which moves up and down depending on whether the clamp 188 is in the lock or release position. The slider bar 224 includes a roller 226 that contacts an outside of the jaw 192. In the release position as shown in FIG. 15, the roller 226 is generally high on the jaw 192. In contrast, after the convex portion 186 has been inserted firmly into the jaws 190, 192, and the clamp 188 is now in the lock position—see FIG. 16—the slider bar 224 and the associated roller 226 have moved downward. Along with the over-center position of the lever arm 206, the slider bar 224 and roller 226 help to further secure the clamp 188 in the lock position.

Figure 17:
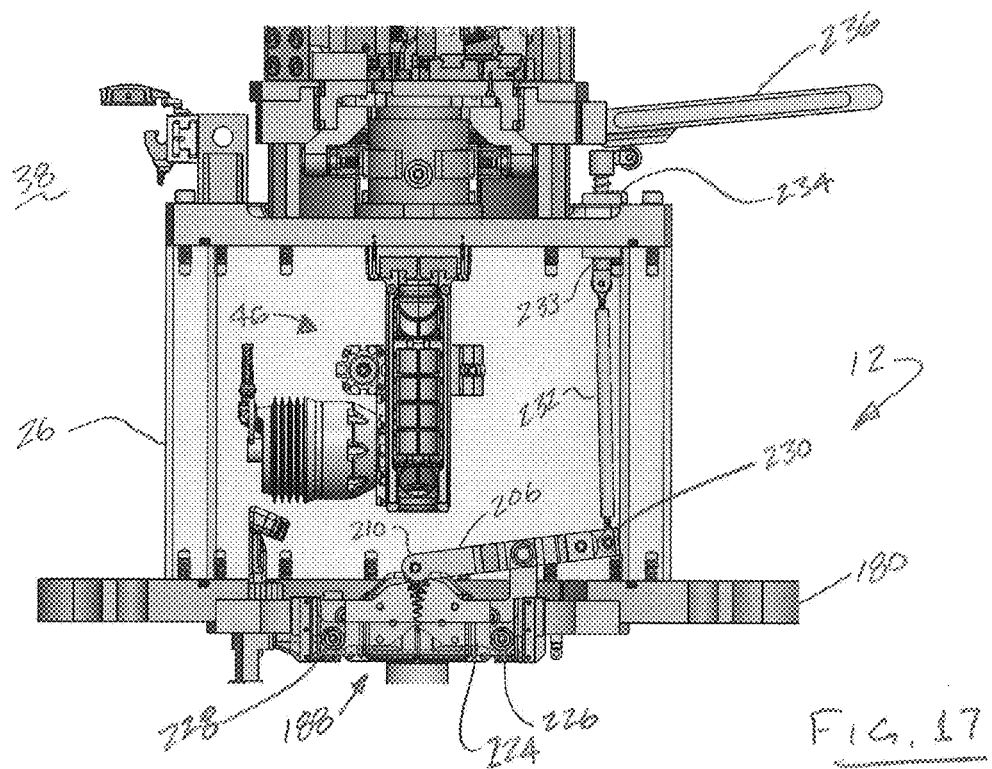
FIG. 17 shows a partial cutaway view of the launch system shown in FIG. 1 illustrating the docking system in the lock position.

FIG. 17 shows a portion of the launch tube 12, and in particular an upper portion of the launch tube 12, including the housing 26. Inside the housing 26 is an actuator arrangement 46, explained in detail above in conjunction with FIG. 4. Also shown in FIG. 17 is the clamp 188 in the locked position, with the lever arm 206 in its over-center position, and the roller 226 and its counterpart roller 228 moved downward with the slider arm 224 to further secure the clamp 188. Because the clamp 188 is disposed within the launch tube 12, it may be convenient to have an actuator operable from outside the launch tube—which in some embodiments may be an actuator disposed outside of the tube 12—that is operable to unlock the clamp 188 and move it to its release position. As shown in FIG. 17, an end 230 of the lever arm 206, which is opposite the end 210, is connected to a connector arm 232.

Figure 18:
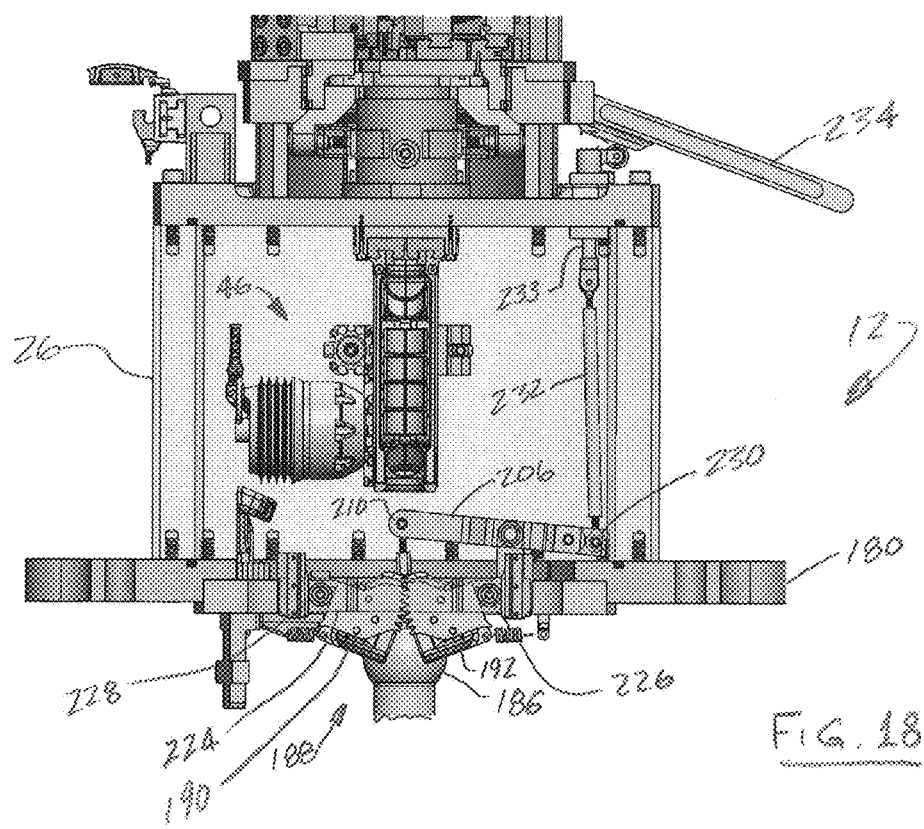
FIG. 18 shows a partial cutaway view of the launch system illustrating the docking system in the release position.

The connector arm 232 extends upward and is connected to a link 233 that goes through a seal arrangement 234 to the ambient environment 38 outside the launch tube 12. The seal arrangement 234 need not be configured like the seal arrangement 48 described above, in part because there is a rigid connector—i.e., the link 233—that goes through the housing 26, rather than the flexible cable 36 described above. In the embodiment shown in FIG. 17, the actuator for moving the clamp 188 from the lock position to the release position includes a release arm 236 that is pivotable upward and downward relative to the connector arm 232. Specifically, as the release arm 236 is moved downward—see FIG. 18—the connector arm 232 is also moved downward, which causes the end 230 of the lever arm 206 to move downward. This in turn raises the other end 210 of the lever arm 206, which raises the slider bar 224 so that the rollers 226, 228 no longer bear against the lower portion of the jaws 190, 192. Having an actuator, such as the release arm 234 disposed outside of the launch tube 12 allows an apparatus, such as the frame 184 to be released inside the launch tube for deployment inside the attached pipeline while the pipeline in launch tube are under pressure. Other types of actuators may be remotely controlled solenoids, etc., so that the linkage from the actuator to the clamp does not need to go through a sealed wall.

FIG. 19 shows a perspective view of the clamp arrangement 182. In the orientation shown in FIG. 19, the lever arm 206 is toward the left, while a corresponding lever arm 238 is shown on the right. The lever arm 238 was not visible in the other drawing figures, which were partial cutaway views of the clamp arrangement 182. As shown in FIG. 19, the slider bar 224 has a counterpart slider bar 240, and it is the slider bar 240 to which lever arm 206 is attached. The jaws 190, 192 are also visible in FIG. 19, as is a portion of the connector arm 232. Although it is understood that each of the slider bars 224, 240 includes two separate rollers, only the roller 226 is visible in FIG. 19. The perspective view shown in FIG. 19 shows the robustness of the clamp arrangement 182, which provides a secure means of locking a heavy apparatus in the launch tube 12.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A launch system for a pressurized pipeline, the launch system including a cable feeder system, comprising: a housing attachable to the pipeline such that an inside of the housing is open to an interior of the pipeline and an outside of the housing is exposed to an ambient environment outside the pipeline; a first actuator arrangement disposed on the outside of the housing; a second actuator arrangement disposed on the inside of the housing; and a seal arrangement disposed in the housing between the first actuator arrangement and the second actuator arrangement, and wherein each of the first and second actuator arrangements is configured to receive a cable having a portion extending outside the housing, a portion extending through the seal arrangement, and a portion extending inside the housing, the actuator arrangements being independently operable to pull the cable relative to the seal arrangement for moving the cable into and out of the pipeline, the first actuator arrangement including a pair of jaws having an open position for receiving the cable and a closed position for securing the cable, at least one of the jaws of the first actuator arrangement being linearly movable relative to the other one of the jaws of first actuator arrangement to effect the open position and the closed position of the jaws of the first actuator arrangement, and wherein the second actuator arrangement includes a pair of jaws having an open position for receiving the cable and a closed position for securing the cable, at least one of the jaws of the second actuator arrangement being linearly movable relative to the other one of the jaws of second actuator arrangement to effect the open position and the closed position of the jaws of the second actuator arrangement.

2. The launch system claim 1, wherein the housing includes a linear track disposed on the outside of the housing and configured to guide movement of the at least one movable jaw of the first actuator arrangement, and a linear track disposed on the inside of the housing and configured to guide movement of the at least one movable jaw of the second actuator arrangement.

3. The launch system of claim 1, wherein each of the first and second actuator arrangements includes a movable track configured to engage the cable when the respective jaws are in the closed position and operable to pull the cable relative to the seal arrangement.

4. The launch system of claim 3, wherein the movable track includes a plurality of arcuate links sized to mate with an outside of the cable, each of the links including a plurality of segments, at least two of the segments being connected by a hinge.

5. The launch system of claim 4, wherein each of the actuator arrangements includes a support structure disposed adjacent to the links on a convex side of the links and providing a reaction force to the links when the cable applies a force to a concave side of the links.

6. The launch system of claim 1, wherein at least one of the first actuator arrangement or the second actuator arrangement is rotatable relative to the housing.

7. A launch system for a pressurized pipeline, the launch system including a cable feeder system, comprising: a housing attachable to the pipeline such that an inside of the housing is in fluid communication with an interior of the pipeline, the housing including a seal arrangement configured to engage a cable extending from outside the pipeline to inside the pipeline such that release of pressurized gas from inside the pipeline to an ambient environment outside the pipeline is inhibited; a first actuator arrangement disposed on one side of the seal arrangement and configured to receive a portion of the cable outside the housing, the first actuator arrangement being operable to pull the cable through the seal arrangement and out of the pipeline; and a second actuator arrangement disposed on another side of the seal arrangement and configured to receive a portion of the cable inside the housing, the second actuator arrangement being operable to pull the cable through the seal arrangement and toward the pipeline, and wherein the first actuator arrangement includes a plurality of jaws selectively movable between open and closed positions for receiving and securing the cable in the jaws of the first actuator arrangement, and the second actuator arrangement includes a plurality of jaws selectively movable between open and closed positions for receiving and securing the cable in the jaws of the second actuator arrangement.

8. The launch system of claim 7, wherein the housing includes a track arrangement disposed on the outside of the housing and configured to guide movement of at least one of the jaws of the first actuator arrangement, and a track arrangement disposed on the inside of the housing and configured to guide movement of at least one of the jaws of the second actuator arrangement.

9. The launch system of claim 7, wherein each of the first and second actuator arrangements includes a movable track configured to engage the cable when the respective jaws are in the closed position and operable to pull the cable relative to the seal arrangement.

10. The launch system of claim 9, wherein the movable track includes a plurality of arcuate links sized to mate with an outside of the cable, each of the links including a plurality of segments, at least two of the segments being connected by a hinge.

11. The launch system of claim 10, wherein each of the actuator arrangements includes a support structure disposed adjacent to the links on a convex side of the links and providing a reaction force to the links when the cable applies a force to a concave side of the links.

12. A launch system for a pressurized pipeline, the launch system including a cable feeder system, comprising:
    a housing including a seal arrangement configured to engage a cable extending from outside the pipeline to inside the pipeline such that release of pressurized gas from inside the pipeline to an ambient environment outside the pipeline through the seal arrangement is inhibited;
    a first actuator arrangement disposed on one side of the seal arrangement and configured to receive a portion of the cable outside the housing; and
    a second actuator arrangement disposed on another side of the seal arrangement and configured to receive a portion of the cable inside the housing, each of the first and second actuator arrangements including a plurality of jaws having an open position and a closed position, and
    wherein each of the first and second actuator arrangements is operable to pull the cable through the seal arrangement when respective jaws of the first and second actuator arrangements are in the closed position.

13. The launch system of claim 12, wherein at least one of the jaws of each of the first and second actuator arrangements is selectively movable between open and closed positions for respectively receiving and securing the cable.

14. The launch system of claim 12, wherein the housing includes a track arrangement disposed on the outside of the housing and configured to guide movement of at least one of the jaws of the first actuator arrangement, and a track arrangement disposed on the inside of the housing and configured to guide movement of at least one of the jaws of the second actuator arrangement.

15. The launch system of claim 12, wherein each of the first and second actuator arrangements includes a movable track configured to engage the cable when the respective jaws are in the closed position and operable to pull the cable relative to the seal arrangement.

16. The launch system of claim 15, wherein the movable track includes a plurality of arcuate links sized to mate with an outside of the cable, each of the links including a plurality of segments, at least two of the segments being connected by a hinge.

17. The launch system of claim 16, wherein each of the actuator arrangements includes a support structure disposed adjacent to the links on a convex side of the links and providing a reaction force to the links when the cable applies a force to a concave side of the links.

18. The launch system of claim 12, wherein at least one of the first actuator arrangement or the second actuator arrangement is rotatable relative to the housing.

* * * * *